United States Patent [19]

Fenwick

[11] 4,395,264
[45] Jul. 26, 1983

[54] AZO COUPLING PROCESS

[75] Inventor: George W. Fenwick, Holland, Mich.

[73] Assignee: BASF Wyandotte Corporation, Wyandotte, Mich.

[21] Appl. No.: 318,750

[22] Filed: Nov. 6, 1981

[51] Int. Cl.$^3$ .............................................. C07C 113/00
[52] U.S. Cl. ...................................... 8/662; 260/141; 260/144
[58] Field of Search .................... 260/141, 144; 8/662

[56] References Cited

U.S. PATENT DOCUMENTS

| | | | |
|---|---|---|---|
| 3,793,305 | 2/1974 | Balon | 260/154 |
| 4,014,866 | 3/1977 | Henning | 260/42.21 |
| 4,046,754 | 9/1977 | Meininger et al. | 260/162 |

*Primary Examiner*—A. Lionel Clingman
*Attorney, Agent, or Firm*—Bernhard R. Swick

[57] ABSTRACT

The present invention relates to a process for coupling beta-naphthol with a diazotized amine as follows:

1. (a) Dissolving a beta-naphthol in water with a strong base
   (b) Precipitating the beta-naphthol with a strong acid and
   (c) Cooling the slurry.
2. Adding a diazotized amine to the beta-naphthol solution and
3. Increasing the pH in two steps, first with a strong base and then with a weak base.

8 Claims, No Drawings

AZO COUPLING PROCESS

BACKGROUND OF THE INVENTION

1. Field of the Invention

This invention relates to a process for preparing azo coloring materials, i.e., dyes and pigments. More specifically, this invention relates to an improved process for preparing azo dyes and pigments characterized by improved consistency and reproducibility of the dyes and pigments produced thereby.

2. Description of the Prior Art

Azo coloring materials have traditionally been prepared on a commercial scale by a multi-step procedure. That procedure involves preparing an appropriate aqueous solution or dispersion of a diazonium salt of a primary amino compound in one reaction vessel, preparing an appropriate aqueous solution or dispersion of a coupling compound in a second vessel and either adding one of these masses to the other or mixing them in a third vessel. It is well known in the prior art to employ phenols, naphthols, etc., and particularly beta-naphthols and beta-naphthol substituted compounds as couplers in the production of azo dyes and pigments. However, production of azo dyes and pigments by the conventional prior art processes often results in batch to batch inconsistencies and lack of reproducibility of the azo dye or pigment produced.

It is a purpose of the instant invention to provide a process for producing azo dyes and pigments, by coupling with beta-naphthols and beta-naphthol substituted compounds, characterized by improved consistency and reproducibility of the product.

| Pertinent Prior Art References | | | |
|---|---|---|---|
| Patent No. | Issued | Inventor | Assignee |
| 4,046,754 | 9/6/77 | Meininger et al | Hoechst |
| 3,793,305 | 2/19/74 | Balon | DuPont |
| 4,014,866 | 3/29/77 | Henning | BASF |

SUMMARY OF THE INVENTION

This invention is directed particularly to a process for coupling beta-naphthol and beta-naphthol substituted compounds with a diazotized amine wherein after the coupler and the diazotized amine are mixed together, the pH is increased in two steps. More specifically, the pH is increased to about 1.0 to 4.0 by the addition of a strong base followed by a further increase to about 5.0 to 10.0 with a weak base.

DESCRIPTION OF THE INVENTION

The present invention comprises a process for coupling beta-naphthol with a diazotized amine as follows:

1. (a) Dissolving a beta-naphthol in water with a strong base
   (b) Precipitating the beta-naphthol with a strong acid and
   (c) Cooling the slurry to about 0° C. to 15° C.
2. Adding a diazotized amine to the beta-naphthol solution and
3. (a) Increasing the pH to about 1.0 to 4.0 with a strong base and
   (b) Further increasing the pH to about 5.0 to 10.0 with a weak base.

As used herein, the expression "beta-naphthol" includes beta-naphthol itself and substituted beta-naphthols. The latter include alkyl derivatives of beta-naphthol which contain alkyl groups having more than 3 carbon atoms, such as butyl, isobutyl, isoamyl, hexyl and octyl groups. Polyalkyl derivatives of beta-naphthol, such as diamyl-2-naphthol are also useful. The beta-naphthol may also be substituted with other groups such as sulfonic acid groups. These naphthols can be prepared by various processes known to the art and can be used in varying stages of purity. Particularly preferred beta-naphthols are beta-naphthol and beta-oxynaphthoic acid for the production of a red dye or pigment. For the production of yellow dyes and pigments, orthochloroaceto acetanilide and ortho-aceto acetanisidide are particularly preferred.

The beta-naphthol is slurried in water at room temperature and the temperature raised to about 55° C. to 65° C. by conventional heating means. The strong base, preferably sodium hydroxide or potassium hydroxide, is added until the beta-naphthol is dissolved generally at a pH of about 10 to 12. When the beta-naphthol is fully dissolved, a strong acid, preferably HCL or $H_2SO_4$, is added until the beta-naphthol is fully reprecipitated which is generally at a pH of about 0.5 to 2.0 after which the solution is cooled to about 0° C. to 15° C.

In a separate container, the diazotized amine is prepared in the conventional manner. In general it is prepared by bringing together in a liquid reaction medium a diazotizable amine and a diazotizing agent. Any aromatic or aliphatic primary amine may be employed, all as well known to those skilled in the art. Typical diazotizable amines include carbocyclic and tetracyclic aromatic amines, nuclearly unsubstituted or nuclearly substituted with one or more groups, for example, nitro, chlorine, bromine, alkyl, alkoxy, cyano carboxy, keto, arylazo, acylamino, sulfo and 'onium groups. These subsistuents may be present in combination in an aromatic amine which is preferably an aniline. Other amines are amines of the benzene series such as aniline, the toluidines the xylidines, anisidine, the chloro and nitro derivatives of aniline and toluidine such as chloroaniline, nitroaniline, chlorotoluidine, nitrotoluidine and the like; amino compounds of the naphthalene series such as alpha-naphthylamine and its derivatives; the diaminodiphenylamines such as benzidine, toluidine and dianisidine. Practically every aromatic primary amine is a potential diazo component. The value of an amine is determined chiefly by the properties of the dye prepared from it. Cost of amine, ease of diazotization, stability of the diazonium salt, and final cost of the dye are factors which influence the selection of an amine. The preferred diazotization agent is nitrous acid and its derivatives.

One preferred method of preparing a diazotized amine is to add the amine to water in amount of about 9 to 15 percent by weight then raise the pH by addition of an amount of a strong base such as sodium hydroxide sufficient to dissolve the amine. This generally results in a pH of about 9.0 to 12.0. The temperature is generally about 65° C. to 80° C. A strong acid is then added until a pH of less than about 2 is obtained, a preferred acid being HCL or $H_2SO_4$. The solution is then cooled to about −5° to 15° C. with a slight excess (i.e., about 3 percent molar excess) of sodium nitrite added. The excess sodium nitrite is then destroyed with sulfamic acid. The preferred molar proportions of diazotized amine and beta-naphthol are about 1:1.

The diazotized amine and coupler are then mixed together, with the temperature maintained at about 5° C. to 20° C. An aqueous solution of a strong base such as sodium hydroxide or potassium hydroxide is added until a pH of about 1.0 to 4.0 is achieved. This solution, preferably contains about 3 percent by weight of the base in water. This addition must be done carefully to avoid having the pH exceed 4.0. The time required to perform this step is not critical, however, generally it should require about 1 to 2 minutes. When this pH range is achieved, a weak base is added. As used herein the expression "weak base" generally means any base that is weaker than the well known strong bases such as sodium hydroxide or potassium hydroxide. Examples of suitable weak bases are ammonia or sodium carbonate and preferably sodium acetate. Generally an aqueous solution of about 1 percent of the weak base is added until a pH of about 5.0 to 10.0 is achieved. This should be done at such a rate that the desired pH is reached in about 5 to 7 minutes after the initial start of the base addition. However, time is not critical. Where a high ultimate pH, i.e., 8–10 is desired, a further strong base addition may be necessary *after* the weak base addition. However, in all cases it is necessary to follow the initial strong base addition with a weak base in order to control the final pH since with the use of strong base alone it is difficult to avoid an excessive final pH.

The reactin is completed by raising the temperature of the reaction to about 95° C. varying the time period for raising the temperature according to the pigment characteristics desired all of which is well known to those skilled in the art. In some cases it may be desirable to add barium chloride or calcium chloride, etc., during heat-up to convert the pigment to a different salt form.

The invention will be described in greater detail in conjunction with the following specific examples in which all parts are by weight and all temperatures in degrees centigrade unless otherwise specified.

EXAMPLE 1

140 grams of 100 percent 2-chloro-5-amino-p-toluene sulfonic acid and 94 grams of hydrochloric acid are added to 1 liter of water in a battery jar. The mixture is stirred for 30 minutes and cooled to 10° C. with ice. 44.8 grams of sodium nitrite is then dissolved in 300 ml of water and slowly added to the above mixture followed by stirring for 1 hour at 10° C. Sulfamic acid is then added to destroy the excess nitrite.

94.6 grams of beta-naphthol, 65.0 grams of sodium hydroxide (50 percent aqueous solution) are added to 370 ml of water in a 600 ml beaker. The mixture is stirred and heated to 60° C. When everything is dissolved, ice is added to cool to a temperature of 10° C. 60 grams of hydrochloric acid (36 percent aqueous solution) is then added until a pH of 0.9 to 1.0 is obtained. The mixture is then stirred for 15 minutes at 10° C.

The diazo slurry and the coupler slurry are mixed together at 10° C. at a pH of less than 1.0. The mixture is stirred for 10 minutes after which a 3 percent by weight aqueous solution of sodium hydroxide is added over a period of 1 to 2 minutes until a pH of 2.2 is obtained. A 1.0 percent aqueous solution of sodium acetate is then immediately added over a 5 to 7 minute period until a pH of 5.5 is obtained. The mixture is then heated to 75° C. and aqueous $BaCL_2$ solution (20%) is added. It is then heated further to 95° C. and held for 5 minutes after which it is cooled to 60° C. with ice and filtered whereby the pigment is isolated.

EXAMPLE 2

The procedure of Example 1 is followed with the exception that in preparing the coupler 96.0 grams of 3-hydroxy-2-naphthoic acid is substituted for the beta-naphthol.

EXAMPLE 3

The procedure of Example 1 is followed with the exception that in preparing the diazo compound 140 grams of 100 percent 1-napthylamine-2-sulfonic acid is substituted for the 2-chloro-5-amino-p-toluene sulfonic acid.

EXAMPLE 4

The procedure of Example 1 is followed with the exception that a tetra azo compound is employed in lieu of a diazo compound. This is prepared by adding 2.72 grams of dichlorobenzidine and 3.77 grams of hydrochloric acid to 18.9 ml of water in a 2 liter beaker. This mixture is stirred for 1 hour after which 1.5 grams of sodium nitrite dissolved in 30 ml of water is added. Excess sodium nitrite is destroyed with sulfamic acid.

EXAMPLE 5

The procedure of Example 1 is followed with the exception that 2-chloro-5-amino-ethyl benzene sulfonic acid is substituted for the 2-chloro-5-amino-p-toluene sulfonic acid.

The embodiments of the invention in which an exclusive privilege or property is claimed are defined as follows:

1. A process for coupling a beta-naphthol with a diazotized amine comprising
   1. (a) dissolving a beta-naphthol in water with a strong base
      (b) precipitating the beta-naphthol with a strong acid and
      (c) cooling the slurry to about 0° C. to 15° C.
   2. (a) adding a diazotized amine and
   3. (a) increasing the pH to about 1.0 to 4.0 with a strong base and
      (b) further increasing the pH to about 5.0 to 10.0 with a weak base.

2. The process of claim 1 wherein in all steps said strong base is sodium hydroxide or potassium hydroxide, said strong acid is hydrochloric acid or sulfuric acid and said weak base is sodium acetate, sodium carbonate or ammonia.

3. The process of claim 1 wherein said solution of beta-naphthol in water and strong base contains sufficient strong base to achieve a pH of 10 to 12, said precipitation with a strong acid results in a pH of 0.5 to 2.0 and the pH is increased in said step 3(a) to a value greater than the pH resulting from steps 1 and 2, said greater pH falling within the range of about 1.0 to 4.0.

4. The process of claim 3 wherein in all steps said strong base is sodium hydroxide, said strong acid is hydrochloric acid and said weak base is sodium acetate.

5. A process for producing an azo coloring material comprising:
   1. diazotizing a substituted a amine by
      (a) mixing said amine with water
      (b) adding a strong base in amount sufficient to dissolve said amine
      (c) adding a strong acid in an amount sufficient to obtain a pH of less than about 2
      (d) cooling to about −5° to 15° C. and (e) slowly adding a slight molar excess of sodium nitrite solution and 2. (a) dissolving a beta-naphthol in water with a strong base
   (b) precipitating the beta-naphthol with a strong acid and
   (c) cooling the slurry to about 0° C. to 15° C.

3. (a) mixing the diazotized amine and said precipitated beta-napthol 4. (a) increasing the pH to a value greater than the pH resulting from steps 1–3, said greater pH falling within the range of about 1.0 to 4.0 with a strong base and
   (b) further increasing the pH to about 5.0 to 10.0 with a weak base.

6. The process of claim 5 wherein in all steps said strong base is sodium hydroxide or potassium hydroxide, said strong acid is hydrochloric acid or sulfuric acid and said weak base is sodium acetate, sodium carbonate or ammonia.

7. The process of claim 5 wherein said strong base is added in step 1(b) in amount sufficient to obtain a pH of about 9.0 to 12.0 and said solution of beta-naphthol in water and strong base contains sufficient sodium hydroxide to have a pH of 10 to 12 and said precipitation with a strong acid results in a pH of 0.5 to 2.0.

8. The process of claim 7 wherein in all steps said strong base is sodium hydroxide, said strong acid is hydrochloric acid and said weak base is sodium acetate.

* * * * *